US008587827B1

(12) United States Patent
Montierth et al.

(10) Patent No.: US 8,587,827 B1
(45) Date of Patent: Nov. 19, 2013

(54) SMART IMAGING DEVICE ARCHITECTURE

(75) Inventors: Mark D. Montierth, Meridian, ID (US);
Douglas G. Keithley, Boise, ID (US);
Richard D. Taylor, Eagle, ID (US)

(73) Assignee: Marvell International Ltd., Hamilton (BM)

( * ) Notice: Subject to any disclaimer, the term of this patent is extended or adjusted under 35 U.S.C. 154(b) by 1136 days.

(21) Appl. No.: 12/538,592

(22) Filed: Aug. 10, 2009

Related U.S. Application Data

(60) Provisional application No. 61/091,610, filed on Aug. 25, 2008.

(51) Int. Cl.
*G06F 15/00* (2006.01)
*G06F 17/50* (2006.01)

(52) U.S. Cl.
USPC .......................................... 358/1.9; 716/100

(58) Field of Classification Search
None
See application file for complete search history.

(56) References Cited

U.S. PATENT DOCUMENTS

| 5,654,764 | A * | 8/1997 | Suh .............................. 348/468 |
| 6,829,007 | B1 * | 12/2004 | Bilhan et al. .................. 348/243 |
| 7,626,735 | B2 * | 12/2009 | Mizuhashi et al. ........... 358/474 |
| 2009/0033753 | A1 * | 2/2009 | Sato et al. .................. 348/217.1 |

* cited by examiner

*Primary Examiner* — Twyler Haskins
*Assistant Examiner* — Marcus T Riley

(57) ABSTRACT

Embodiments of the present invention provide an integrated circuit having analog front end (AFE) circuitry to convert an analog signal to a digital signal, the analog signal being associated with an image captured by a sensor of an imaging device, illumination drive circuitry to drive an illumination source of the imaging device, and one or more transformation elements to operate on the digital signal to provide image correction of the captured image, wherein the AFE circuitry, the illumination drive circuitry, and the one or more transformation elements are integrated on a single chip. Other embodiments may be described and/or claimed.

18 Claims, 3 Drawing Sheets

SMART IMAGING DEVICE ARCHITECTURE

CROSS REFERENCE TO RELATED APPLICATIONS

The present application claims priority to U.S. Provisional Patent Application No. 61/091,610, filed Aug. 25, 2008, entitled "An Architecture for Creating a Smart Scan Module Creating Low Cost, Printer Multifunction Products," the entire specification of which is hereby incorporated by reference in its entirety for all purposes, except for those sections, if any, that are inconsistent with this specification.

TECHNICAL FIELD

Embodiments of the present invention relate to the field of imaging devices, and more particularly, to smart imaging device architecture.

BACKGROUND

Generally, imaging devices such as scanners or copiers are increasingly being employed in a variety of electronic devices. For example, multi-function devices (MFDs) such as multi-function printers (MFPs) may incorporate mechanisms for printing, copying, scanning, and/or faxing and may additionally include capabilities to scan or copy directly to email, memory cards, or other forms of storage.

Traditional architecture of current imaging devices typically includes separate assemblies for different functional elements. For example, a preponderance of scanning device configurations have separate discrete assemblies for each of an optical scanning assembly, an analog front end circuit for digitizing analog signals, and data transformation functionality to compensate for numerous individual variances in lighting, sensor, and/or optics of the imaging device. A preponderance of scanning device configurations may also have discrete assemblies for each of a set of transforms associated with a copy pipe and a print pipe.

Such configurations may require extensive cabling to interconnect the separate assemblies, which may increase the cost for cabling and shielding in order to contain radiated emissions from signals transferred over the cabling. For example, cabling may transfer analog signals over longer distances from an image sensor to an analog front end circuit for digitization, increasing the possibility of undesirable radiation emissions that may compromise image quality of an image captured by the image sensor. Configurations having separate assemblies may further increase development and materials costs because higher cost custom chips may be created for each of the separate assemblies.

Signals from a sensor module of a conventionally arranged imaging device may also have a higher data rate because data transforms that reduce a data rate may not be performed until the signals are processed in a separate assembly that is not integrated in the sensor module. Improvements to these and other cost and quality issues of existing imaging architectures would be desirable.

SUMMARY

The present disclosure provides an integrated circuit including analog front end (AFE) circuitry to convert an analog signal to a digital signal, the analog signal being associated with an image captured by a sensor of an imaging device, illumination drive circuitry to drive an illumination source of the imaging device, and one or more transformation elements to operate on the digital signal to provide image correction of the captured image, wherein the AFE circuitry, the illumination drive circuitry, and the one or more transformation elements are integrated on a single chip.

The present disclosure further provides the integrated circuit, wherein the one or more transformation elements are configured to reduce a number of pixels of the captured image and/or to reduce a number of bits per pixel of the captured image, and wherein the one or more transformation elements are further configured to provide at least one of margin cropping, gain, shadow correction, dark signal non-uniformity (DSNU) and/or photo response non-uniformity (PRNU) correction, bad pixel correction, horizontal scaling, compression, and bit-depth reduction.

The present disclosure further provides the integrated circuit, wherein the analog front end circuitry comprises an analog-to-digital converter (ADC) to convert the analog signal to the digital signal, and a reset level clamp (RLC) and/or a correlated double sample circuit (CDS) coupled with the analog-to-digital converter to condition the analog signal prior to conversion to the digital signal.

The present disclosure further provides the integrated circuit, wherein the illumination drive circuitry comprises at least one of a pulse width modulation (PWM) circuit, a current source, and a digital-to-analog converter (DAC).

In various embodiments, the integrated circuit includes a phase lock loop (PLL) integrated on the single chip to provide a reference clock for the integrated circuit, and a sensor timing generator integrated on the single chip and coupled to the phase lock loop to provide timing for components of the integrated circuit.

In various embodiments, the integrated circuit includes a serial interface configured to output the digital signal from the integrated circuit.

The present disclosure also provides an imaging device including an illumination source to provide illumination for image capture and a sensor module operatively coupled with the illumination source, the sensor module having a sensor to capture one or more images and an integrated circuit formed on a single chip coupled to the sensor and configured proximate to the sensor, the integrated circuit comprising analog front end (AFE) circuitry to convert an analog signal to a digital signal, the analog signal being associated with an image captured by the sensor, illumination drive circuitry to drive the illumination source, and one or more transformation elements to operate on the digital signal to provide image correction of the captured image.

In various embodiments, the imaging device includes an application specific integrated circuit (ASIC), the ASIC comprising a copy pipeline having one or more transformation elements to further operate on the digital signal to modify image data of the captured image, and a print pipeline having one or more transformation elements and control logic to receive and format the modified image data from the copy pipeline for printing on a printing device.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

Embodiments of the present invention describe smart imaging device architecture and associated techniques. In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)."

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
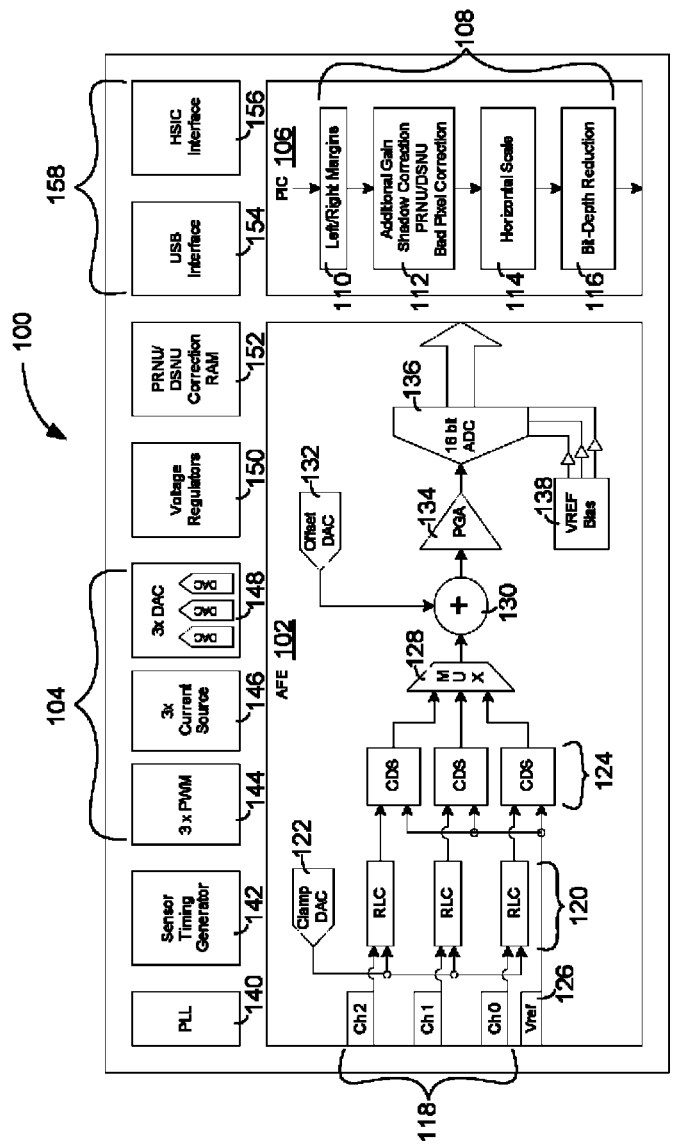
FIG. 1 is a schematic diagram of an integrated circuit architecture for an imaging device, in accordance with various embodiments of the present invention.

FIG. 1 is a schematic diagram of an integrated circuit architecture for an imaging device, in accordance with various embodiments of the present invention. In an embodiment, an integrated circuit 100 of an imaging device includes analog front end (AFE) circuitry 102, illumination drive circuitry (IDC) 104, and pipeline image correction (PIC) 106, integrated on a single chip. Integrated circuit 100 may be configured to drive illumination of an imaging device and provide digitization of an analog signal associated with an image captured by the imaging device. Integrated circuit 100 may be further configured to provide image correction by transforming the digitized signal.

AFE circuitry 102 may be configured to convert an analog signal to a digital signal. The analog signal may, for example, be output from an image sensor (not shown) of an imaging device and may include information about a captured image. AFE circuitry 102 may, for example, convert each sensed individual pixel of the image sensor in the form of an analog signal to a digital representation. The analog signal from the sensor may be received by one or more channels 118 such as, for example, the three representative channels Ch0, Ch1, Ch2 depicted in FIG. 1. More or fewer channels 118 may be used in various embodiments. The number of channels 118 may vary, for example, according to output requirements of one or more image sensors. For example, a lower cost image sensor may include a single channel 118.

The analog signal received by the one or more channels 118 may be conditioned or otherwise prepared for digitization. In an embodiment, the analog signal is conditioned using gain stages and/or offsets, which may be provided, for example, by one or more reset level clamps (RLC) 120 and one or more correlated double sample (CDS) circuits 124. The RLC 120 and CDS 124 circuits may be analog components used when an incoming signal is alternating current (AC) coupled through an external capacitor (not shown). The RLC 120 circuit may be used to force a known voltage on the external capacitor. A clamp digital-to-analog converter (DAC) 122 and reference voltage (Vref) 126 may be coupled to RLC 120 and CDS 124 components as illustrated. The clamp DAC 122 may be a reset level clamp DAC (RLC DAC) that provides a reference value to the RLC 120 circuitry. Other forms of conditioning or no conditioning at all may be implemented in other embodiments.

According to various embodiments, a multiplexer (MUX) 128 is configured to sequentially sample the analog signals from the channels 118 and output to an analog-to-digital converter (ADC) 136. In other embodiments, MUX 128 is not used and each channel 118 is coupled to an ADC 136. For example, the three channels 118 may be coupled respectively to three ADCs 136. Other numbers of channels 118 and/or ADCs 136 may be used in other embodiments.

In an embodiment, AFE circuitry 102 comprises offset digital-to-analog converter (DAC) 132, adder 130, and programmable gain amplifier (PGA) 134, coupled as illustrated, to further process the analog signal prior to digitization. The analog signal may be converted to a digital signal by ADC 136. The digital signal output from ADC 136 may comprise, for example, bits of digital data. ADC 136 may be further coupled to a reference voltage (VREF) bias 138 as illustrated. In one embodiment, ADC 136 outputs a 16 bit digital signal per pixel associated with the analog signal. More or fewer bits per pixel may be output from ADC 136 in other embodiments.

The digital signal output from ADC 136 may be further processed using pipeline image correction (PIC) 106 of integrated circuit 100. PIC 106 may include one or more transformation elements 108 to operate on the digital signal to provide image correction of a captured image. The one or more transformation elements 108 may include, for example, functionality to reduce a number of pixels of the captured image or to reduce a number of bits per pixel of the captured image, or combinations thereof. PIC 106 may reduce data output or provide a lower data rate from integrated circuit 100. For example, a digitized signal having about 16 bits per pixel may be input to PIC 106 and a digitized signal having about 8-10 bits per pixel may be output from PIC 106. Subject matter is not limited in this regard and may include other data density or rates in other embodiments.

Transformation elements 108 may provide image correction that compensates for anomalies caused, for example, by variations in the lighting, the sensor, and/or the optics. For example, horizontal scaling 114 may compensate for discrepancies between an incorrect number of dots per inch (dpi) provided by reduction optics of an imaging device and a specified dpi value for the captured image.

In one embodiment, the one or more transformation elements 108 are configured to provide at least one of margin cropping 110, gain, shadow correction, dark signal non-uniformity (DSNU) and/or photo response non-uniformity (PRNU) correction, bad or dead pixel correction 112, horizontal scaling 114, compression, and bit-depth reduction 116. Integrated circuit 100 may further include a storage device such as, for example, PRNU/DSNU correction random access memory (RAM) 152 coupled with PIC 106 to store data associated with DSNU and/or PRNU correction.

PIC 106 may include compression functionality in one or more embodiments. Compression may be used, for example, where AFE circuitry 102 operates at a sufficiently high rate that a serial interface 158 becomes rate limiting. Bit-depth reduction 116 may include a gamma-like correction to provide a captured image that is better suited for human perception. Other well known image correction functionality may be implemented in PIC 106. More or less image correction functionality than described or depicted may be implemented in various embodiments.

Integrated circuit 100 may include illumination drive circuitry 104 to drive an illumination source of the imaging device. In an embodiment, illumination drive circuitry 104 includes at least one of a pulse width modulation (PWM) circuit 144, a current source 146, and a digital-to-analog converter (DAC) 148 coupled collectively to drive and/or power the illumination source.

Integrated circuit 100 may include a variety of components to support and/or enable functionality of AFE circuitry 102. In an embodiment, integrated circuit 100 includes a phase lock loop (PLL) 140 to provide a reference clock for the integrated circuit 100. Integrated circuit 100 may further include a sensor timing generator 142 coupled with the PLL 140 to provide timing for a variety of functions and/or components of the integrated circuit 100. Sensor timing generator 142 may, for example, provide timing for analog signals, ADC 136 sampling, and/or serial interface 158 communication.

In an embodiment, integrated circuit 100 includes one or more voltage regulators 150 to provide different voltages for different components. For example, specific voltages may be provided for various digital and analog components of the image sensor. Voltage regulators 150 may be configured to regulate voltages of one or more signals associated with the image sensor.

Integrated circuit 100 may include the serial interface 158 configured to at least output a digitized signal associated with a captured image. Serial interface 158 may be further configured to communicate signals to and from the integrated circuit 100 and/or provide power to one or more components of the integrated circuit 100. In an embodiment, serial interface 158 comprises a universal serial bus (USB) interface 154, or a high-speed inter-chip (HSIC) interface 156, or combinations thereof.

Figure 2:
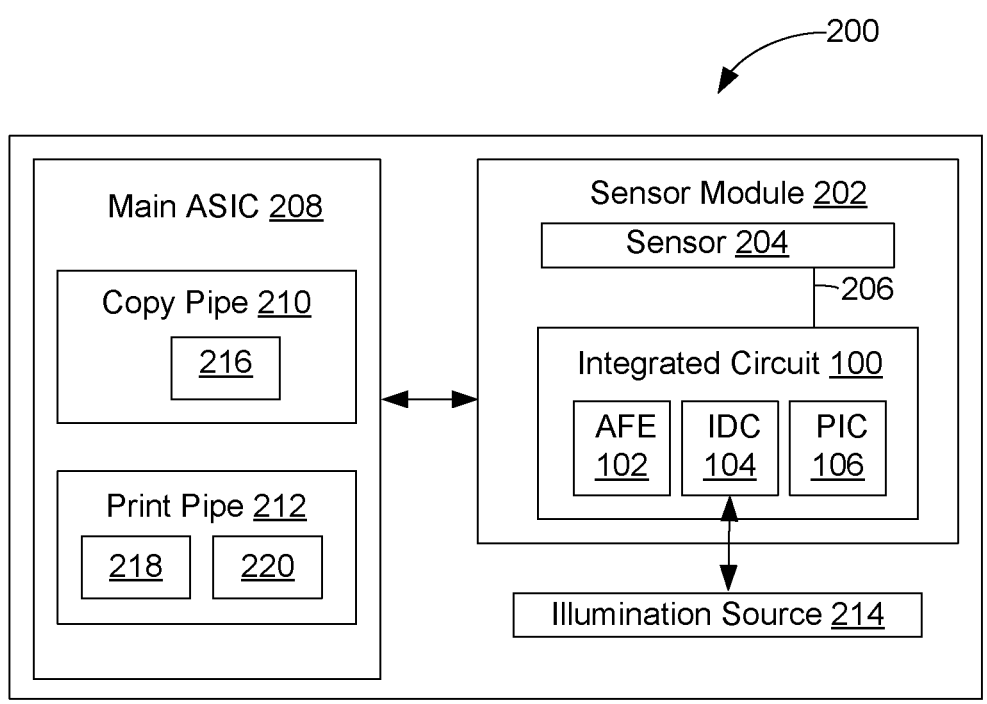
FIG. 2 is a schematic diagram of an imaging device architecture, in accordance with various embodiments of the present invention.

FIG. 2 is a schematic diagram of an imaging device architecture, in accordance with various embodiments of the present invention. Imaging device 200 may include a sensor module 202 comprising an image sensor 204 coupled with an integrated circuit 100 having AFE circuitry 102, illumination drive circuitry (IDC) 104, and pipeline image correction (PIC) 106, as described with respect to FIG. 1. The sensor module 202 may be operatively coupled with an illumination source 214 and operatively coupled with a main application specific integrated circuit (ASIC) 208 comprising a copy pipeline 210 and/or a print pipeline 212 according to various embodiments. The term pipeline may be referred to as "pipe" herein.

The image sensor 204 is used to capture one or more images. For example, image sensor 204 may include at least one of a contact image sensor (CIS) and a charge-coupled device (CCD) sensor to capture images associated with copying, scanning, and/or faxing.

The integrated circuit 100 as described with respect to FIG. 1 is configured proximate to the sensor 204. Configuring integrated circuit 100 proximate to the sensor 204 may substantially reduce cabling and/or undesirable signal noise in imaging device 200. In an embodiment, integrated circuit 100 is coupled to sensor 204 by cable 206. Integrated circuit 100 may comprise AFE circuitry 102 to convert an analog signal associated with an image captured by the sensor 204 to a digital signal. Integrated circuit 100 may further comprise illumination drive circuitry (IDC) 104 to drive the illumination source 214 and pipeline image correction (PIC 106) comprising one or more transformation elements to operate on the digital signal to provide image correction of the captured image. Integrated circuit 100 may include more or fewer components as described with respect to FIG. 1.

Imaging device 200 includes the illumination source 214 to provide illumination for image capture. Illumination source 214 may be operatively coupled to IDC 104 of integrated circuit 100 to allow the IDC 104 to drive the illumination for the imaging device 200. In an embodiment, illumination source 214 comprises one or more light emitting diodes (LEDs). Subject matter is not limited in this regard and illumination source 214 may comprise a variety of other light technologies to provide illumination for image capture.

Imaging device 200 further includes the main ASIC 208 operatively coupled with the sensor module 202 to at least provide functionality associated with copy pipe 210 and/or print pipe 212. Copy pipe 210 may include one or more transformation elements 216 to operate on the digital signal output from the PIC 106 of the integrated circuit 100 to further modify and/or correct the digitized image data. The one or more transformation elements 216 of the copy pipe 210 may be configured to provide, for example, halftoning, color space conversion, sharpening, scaling, edge enhancement, or smoothing. Copy pipe 210 may include transformation elements 216 that require substantial space on a chip such that they are better disposed on the main ASIC 208 than PIC 106 of integrated circuit 100 to avoid potential space constraints within sensor module 202.

Print pipe 212 may comprise one or more transformation elements 218 and control logic 220 to receive and format the modified image data from the copy pipe 210 for printing on a printing device. Imaging device 200 may be, for example, a multi-function device having at least scanning/copying and printing functionality. According to various embodiments, imaging device 200 may be a stand-alone scanning device, fax machine, copier, or camera. Subject matter is not limited in this regard and imaging device 200 may include other devices in other embodiments.

The imaging device 200 wherein the integrated circuit 100 is configured proximate to the sensor 204 may allow fewer signals or a lower data rate to transfer data from the sensor module 202 to other components such as, for example, copy pipe 210 of main ASIC 208. For example, PIC 106 may reduce a raw digital signal from AFE circuitry 102 by removing bits associated with pixel correction and/or by reducing a number of bits per pixel to provide the lower data rate signal.

Digital output from integrated circuit 100 may be less susceptible to noise than analog output from sensor 204. Thus, placing the analog conversion element (e.g., AFE circuitry 102) closer to the sensor 204 may improve image quality by reducing potential noise sources to the analog signal. Cabling 206 may be reduced by including the integrated circuit 100 within the sensor module 202 to be near the sensor 204. Thus, imaging device 200 may enable simpler, lower cost cabling 206 between the sensor 204 and integrated circuit 100 and simpler, lower cost cables or other interconnects to couple the integrated circuit 100 with other components such as main ASIC 208. Such configuration may reduce radiated emissions of the imaging device 200 by facilitating lower voltage signaling.

The imaging device 200 configured as described herein may further reduce development and materials costs of imaging devices by avoiding the creation of custom solutions (e.g., silicon solutions) for the various elements integrated together here. Thus, the imaging device architecture described herein may facilitate component reduction and/or board area simplification.

Figure 3:
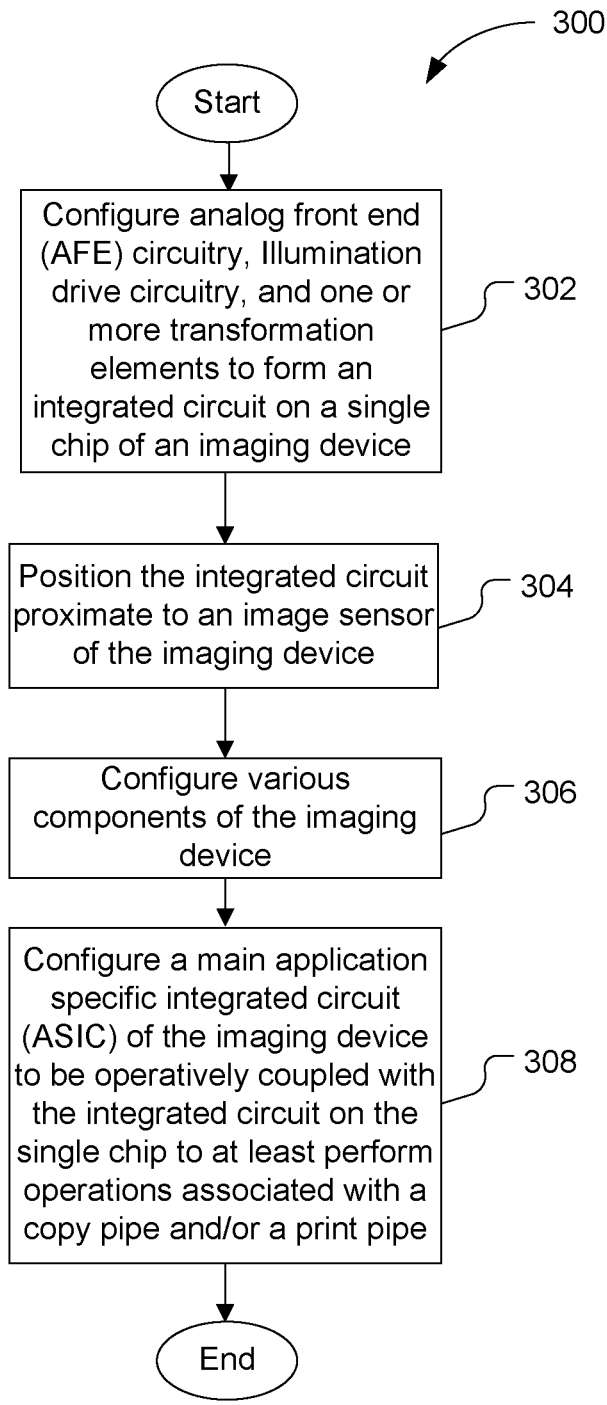
FIG. 3 is a process flow diagram of a method to configure architecture of an imaging device, in accordance with various embodiments of the present invention.

FIG. 3 is a process flow diagram of a method 300 to configure architecture of an imaging device, in accordance with various embodiments of the present invention. In an embodiment, method 300 includes configuring analog front end (AFE) circuitry, illumination drive circuitry, and one or more transformation elements to form an integrated circuit on a single chip of an imaging device at block 302, positioning the integrated circuit to be proximate to an image sensor of the imaging device at block 304, and configuring a main application specific integrated circuit (ASIC) of the imaging device to be operatively coupled with the integrated circuit on the single chip to at least perform operations associated with a copy pipe and/or a print pipe at block 306.

Block 302 includes configuring the AFE circuitry, illumination drive circuitry, and the one or more transformation elements in an arrangement described with respect to FIGS. 1-2. Block 304 includes integrating the integrated circuit having at least the AFE circuitry in a sensor module of the imaging device. The single chip may be in a variety of forms including a package substrate, printed circuit board, or other well-known suitable forms.

Method 300 may further include configuring various components of the imaging device at block 306. Block 306 may include, for example, configuring an illumination source to provide illumination for image capture, and configuring a sensor module to be operatively coupled with the illumination source. The sensor may be operatively coupled with the illumination source to capture one or more images of an object associated with copying, scanning, and/or faxing. The illumination source may provide illumination of the object while the sensor senses or captures the image.

Block 306 may further include operatively coupling the illumination source and the illumination drive circuitry of the integrated circuit together such that the illumination drive circuitry can drive or control the illumination of the imaging device. The illumination drive circuitry may comprise, for example, a PWM circuit, a current source, and/or a DAC to drive the illumination.

Method 300 further includes coupling the integrated circuit to the image sensor to receive an analog signal associated with image capture at block 306. Coupling may be accomplished, for example, by cable or any other suitable interconnect. AFE circuitry may be configured to convert the analog signal to a digital signal. In an embodiment, method 300 includes configuring an ADC of the AFE circuitry to digitize the analog signal and configuring at least one of a reset level clamp (RLC) and a correlated double sample circuit (CDS) coupled with the ADC to condition the analog signal prior to digitization at block 306.

Block 306 may further include configuring the one or more transformation elements of the integrated circuit to receive the digitized signal from the AFE circuitry to provide image correction via data transforms. In an embodiment, the transformation elements are configured in a series pipeline. The transformation elements may be configured to reduce a number of pixels of the captured image represented by the digitized signal and/or to reduce a number of bits per pixel of the captured image. The transformation elements may be configured to perform at least one of margin cropping, gain, shadow correction, dark signal non-uniformity (DSNU) and/or photo response non-uniformity (PRNU) correction, bad pixel correction, horizontal scaling, compression, and bit-depth reduction. A storage device associated with PRNU/DSNU correction may be configured to store data associated with DSNU and/or PRNU correction.

Block 306 may further include configuring a phase lock loop (PLL) to provide a reference clock for the integrated circuit and configuring a sensor timing generator coupled to the PLL to provide timing for components of the integrated circuit. PLL and the sensor timing generator may be disposed on the single chip of the integrated circuit. Block 306 may further include configuring one or more voltage regulators coupled to the integrated circuit to regulate a voltage of one or more signals associated with the sensor, including, for example, analog and digital signals. In an embodiment, the one or more voltage regulators are disposed on the single chip of the integrated circuit.

Block 306 may further include configuring a serial interface to at least output the digital signal representing the corrected image data from the one or more transformation elements to other components of the imaging device such as, for example, a copy pipe. The serial interface may be configured to provide other signals and/or power to and/or from the integrated circuit of the sensor module. In an embodiment, the serial interface comprises at least one of a high-speed interchip (HSIC) interface and a universal serial bus (USB) interface. Other types of interfaces may be used in other embodiments.

Block 308 may include configuring a copy pipe and/or a print pipe to further modify the corrected image data from the one or more transformation elements of the integrated circuit. For example, a main ASIC may be configured to perform further data transformation on the corrected image data using one or more transformation elements of the copy pipe at block 308. The one or more transformation elements of the copy pipe may include functionality to perform, for example, half-toning, color space conversion, sharpening, scaling, edge enhancement, or smoothing, or combinations thereof. Other data transformations may be performed in other embodiments.

Block 308 may further include configuring a print pipe comprising one or more transformation elements and/or control logic to receive and format the modified image data from the copy pipeline for printing on a printing device. Method 300 may comport with actions and techniques already described with respect to FIGS. 1-2.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An integrated circuit comprising:
   analog front end circuitry configured to convert an analog signal to a digital signal, the analog signal being associated with an image captured by a sensor of an imaging device;
   illumination drive circuitry configured to drive an illumination source of the imaging device; and
   one or more transformation elements configured to operate on the digital signal to provide image correction of the image captured by the sensor of the imaging device,
   wherein (i) the analog front end circuitry, (ii) the illumination drive circuitry, and (iii) the one or more transformation elements are integrated on a single chip, and
   wherein the analog front end circuitry comprises
       a clamp digital to analog converter configured to provide a reference value,
       a reset level clamp configured to (i) receive the reference value from the clamp digital to analog converter, (ii) receive the analog signal from the sensor, and (ii) based on the reference value from the clamp digital to analog converter and the analog signal from the sensor, generate a first output signal,
       a correlated double sample circuit configured to (i) receive the first output signal from the reset level clamp, (ii) receive a reference voltage, and (iii) based on the first output signal from the reset level clamp and the reference voltage, generate a second output signal, and
       an analog to digital converter configured to, based on the second output signal, generate the digital signal.

2. The integrated circuit of claim 1, wherein:
   the one or more transformation elements are configured to reduce one or both of (i) a number of pixels of the image captured by the sensor of the imaging device or (ii) a number of bits per pixel of the captured image; and
   the one or more transformation elements are further configured to provide at least one of margin cropping, gain, shadow correction, dark signal non-uniformity (DSNU) or photo response non-uniformity (PRNU) correction, bad pixel correction, horizontal scaling, compression, and bit-depth reduction.

3. The integrated circuit of claim 2, further comprising:
   a storage device to store data associated with one or both (i) the DSNU or (ii) the PRNU correction.

4. The integrated circuit of claim 1, wherein the illumination drive circuitry comprises a pulse width modulation (PWM) circuit, a current source, or a digital-to-analog converter (DAC).

5. The integrated circuit of claim 1, further comprising:
   a phase lock loop (PLL) integrated on the single chip to provide a reference clock for the integrated circuit; and
   a sensor timing generator integrated on the single chip and coupled to the phase lock loop to provide timing for components of the integrated circuit.

6. The integrated circuit of claim 1, further comprising:
   a serial interface configured to output the digital signal from the integrated circuit.

7. The integrated circuit of claim 6, wherein the serial interface comprises a high-speed inter-chip (HSIC) interface or a universal serial bus (USB) interface.

8. An imaging device comprising:
   an illumination source to provide illumination for image capture; and
   a sensor module operatively coupled with the illumination source, the sensor module comprising
       (A) a sensor to capture one or more images, and
       (B) an integrated circuit formed on a single chip, wherein the integrated circuit is coupled to the sensor, wherein the integrated circuit is configured proximate to the sensor, and wherein the integrated circuit comprises
           (i) analog front end circuitry to convert an analog signal to a digital signal, the analog signal being associated with an image captured by the sensor,
           (ii) illumination drive circuitry to drive the illumination source, and
           (iii) one or more transformation elements to operate on the digital signal to provide image correction of the image captured by the sensor,
   wherein the analog front end circuitry comprises
       a clamp digital to analog converter configured to provide a reference value,
       a reset level clamp configured to (i) receive the reference value from the clamp digital to analog converter, (ii) receive the analog signal from the sensor, and (ii) based on the reference value from the clamp digital to analog converter and the analog signal from the sensor, generate a first output signal,
       a correlated double sample circuit configured to (i) receive the first output signal from the reset level clamp, (ii) receive a reference voltage, and (iii) based on the first output signal from the reset level clamp and the reference voltage, generate a second output signal, and
       an analog to digital converter configured to, based on the second output signal, generate the digital signal.

9. The imaging device of claim 8, further comprising an application specific integrated circuit (ASIC), the ASIC comprising:
   the copy pipeline comprising one or more transformation elements to further operate on the digital signal to modify image data of the captured image; and
   the print pipeline comprising one or more transformation elements and control logic to receive and format the modified image data from the copy pipeline for printing on a printing device.

10. The imaging device of claim 9, wherein the one or more transformation elements of the copy pipeline are configured to provide halftoning, color space conversion, sharpening, scaling, edge enhancement, or smoothing, or combinations thereof.

11. The imaging device of claim 8, wherein:
   the one or more transformation elements of the integrated circuit are configured to reduce a number of pixels of the captured image or to reduce a number of bits per pixel of the captured image, or combinations thereof; and
   the one or more transformation elements are configured to provide at least one of margin cropping, gain, shadow correction, one or both of (i) dark signal non-uniformity (DSNU) or (ii) photo response non-uniformity (PRNU) correction, bad pixel correction, horizontal scaling, compression, and bit-depth reduction.

12. The imaging device of claim 11, wherein the integrated circuit further comprises a storage device to store data associated with one or both of (i) the DSNU or (ii) the PRNU correction.

13. The imaging device of claim 8, wherein the illumination drive circuitry of the integrated circuit comprises a pulse width modulation (PWM) circuit, a current source, or a digital-to-analog converter (DAC).

14. The imaging device of claim 8, wherein the integrated circuit further comprises:
- a phase lock loop (PLL) integrated on the single chip to provide a reference clock for the integrated circuit; and
- a sensor timing generator integrated on the single chip and coupled to the phase lock loop to provide timing for components of the integrated circuit.

15. The imaging device of claim 8, wherein the integrated circuit further comprises:
- a serial interface configured to output the digital signal from the integrated circuit, wherein the serial interface comprises one or more of a high-speed inter-chip (HSIC) interface or a universal serial bus (USB).

16. The imaging device of claim 8, wherein:
- the sensor comprises a contact image sensor (CIS) or a charge-coupled device (CCD); and
- the illumination source comprises one or more light emitting diodes (LED).

17. The imaging device of claim 8, wherein the integrated circuit is configured proximate to the sensor to allow fewer signals to one or more of (i) transfer data from the sensor module, (ii) reduce radiated emissions by allowing lower-voltage signaling, and (iii) reduced cabling.

18. The imaging device of claim 8, wherein the imaging device comprises a scanning device, a fax machine, a camera, or a multi-function device.

\* \* \* \* \*